United States Patent
Clark et al.

(10) Patent No.: US 9,936,000 B2
(45) Date of Patent: *Apr. 3, 2018

(54) SYSTEMS AND METHODS FOR TRANSMITTING DATA

(71) Applicant: VMware, Inc., Palo Alto, CA (US)

(72) Inventors: Jonathan Clark, San Francisco, CA (US); Ji Feng, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/219,080

(22) Filed: Jul. 25, 2016

(65) Prior Publication Data
US 2016/0337440 A1  Nov. 17, 2016

Related U.S. Application Data

(63) Continuation of application No. 13/921,164, filed on Jun. 18, 2013, now Pat. No. 9,401,973.

(51) Int. Cl.
*G06F 15/16* (2006.01)
*H04L 29/08* (2006.01)
*H04L 29/06* (2006.01)

(52) U.S. Cl.
CPC .......... *H04L 67/06* (2013.01); *H04L 67/02* (2013.01); *H04L 67/22* (2013.01); *H04L 67/325* (2013.01); *H04L 67/42* (2013.01)

(58) Field of Classification Search
CPC ....... H04L 29/06; H04L 67/02; H04L 67/325; H04L 67/42; H04L 29/08; G06F 15/16
See application file for complete search history.

(56) References Cited

U.S. PATENT DOCUMENTS

| | | | |
|---|---|---|---|
| 7,047,281 B1* | 5/2006 | Kausik | G06F 17/30905 707/E17.121 |
| 7,711,922 B2 | 5/2010 | Jerding et al. | |
| 2001/0003830 A1 | 6/2001 | Nielsen | |
| 2002/0138624 A1 | 9/2002 | Esenther | |
| 2003/0005455 A1 | 1/2003 | Bowers | |
| 2003/0140090 A1 | 7/2003 | Rezvani | |
| 2004/0205165 A1* | 10/2004 | Melamed | G06F 17/30902 709/219 |
| 2007/0244987 A1* | 10/2007 | Pedersen | H04L 63/0272 709/217 |
| 2008/0049786 A1 | 2/2008 | Ram et al. | |
| 2010/0077035 A1 | 3/2010 | Li | |

(Continued)

*Primary Examiner* — Benjamin M Thieu
(74) *Attorney, Agent, or Firm* — Fish & Richardson P.C.

(57) ABSTRACT

A server is in communication with a plurality of clients being executed by a host. The server is configured to receive a message from a first client of the plurality of clients. The message indicates that the first client currently has focus, wherein the message is transmitted by the first client with a first cookie. The server is configured to identify that a second client of the plurality of clients utilizes a second cookie that matches the first cookie, wherein the second client is currently receiving data from the server using a low-latency update mechanism. The server is also configured to downgrade the second client from the low-latency update mechanism to a high-latency update mechanism, wherein the high-latency update mechanism is configured to enable the second client to conduct a poll of the server periodically for updates.

19 Claims, 2 Drawing Sheets

(56) References Cited

U.S. PATENT DOCUMENTS

| | | |
|---|---|---|
| 2010/0192069 A1* | 7/2010 | Toebes .................. G06F 21/316 715/745 |
| 2010/0319056 A1* | 12/2010 | Gillum .................... G06F 21/31 726/5 |
| 2011/0264753 A1 | 10/2011 | Park et al. |
| 2012/0023226 A1 | 1/2012 | Petersen |
| 2012/0023236 A1 | 1/2012 | Backholm |
| 2012/0131095 A1 | 5/2012 | Luna |
| 2012/0324358 A1 | 12/2012 | Jooste |
| 2013/0254343 A1 | 9/2013 | Stevens et al. |
| 2014/0258639 A1 | 9/2014 | Recupero |
| 2014/0344345 A1* | 11/2014 | Venkatraman ...... H04L 61/6009 709/203 |
| 2014/0365427 A1 | 12/2014 | Bertram |
| 2014/0372512 A1 | 12/2014 | Clark et al. |

* cited by examiner

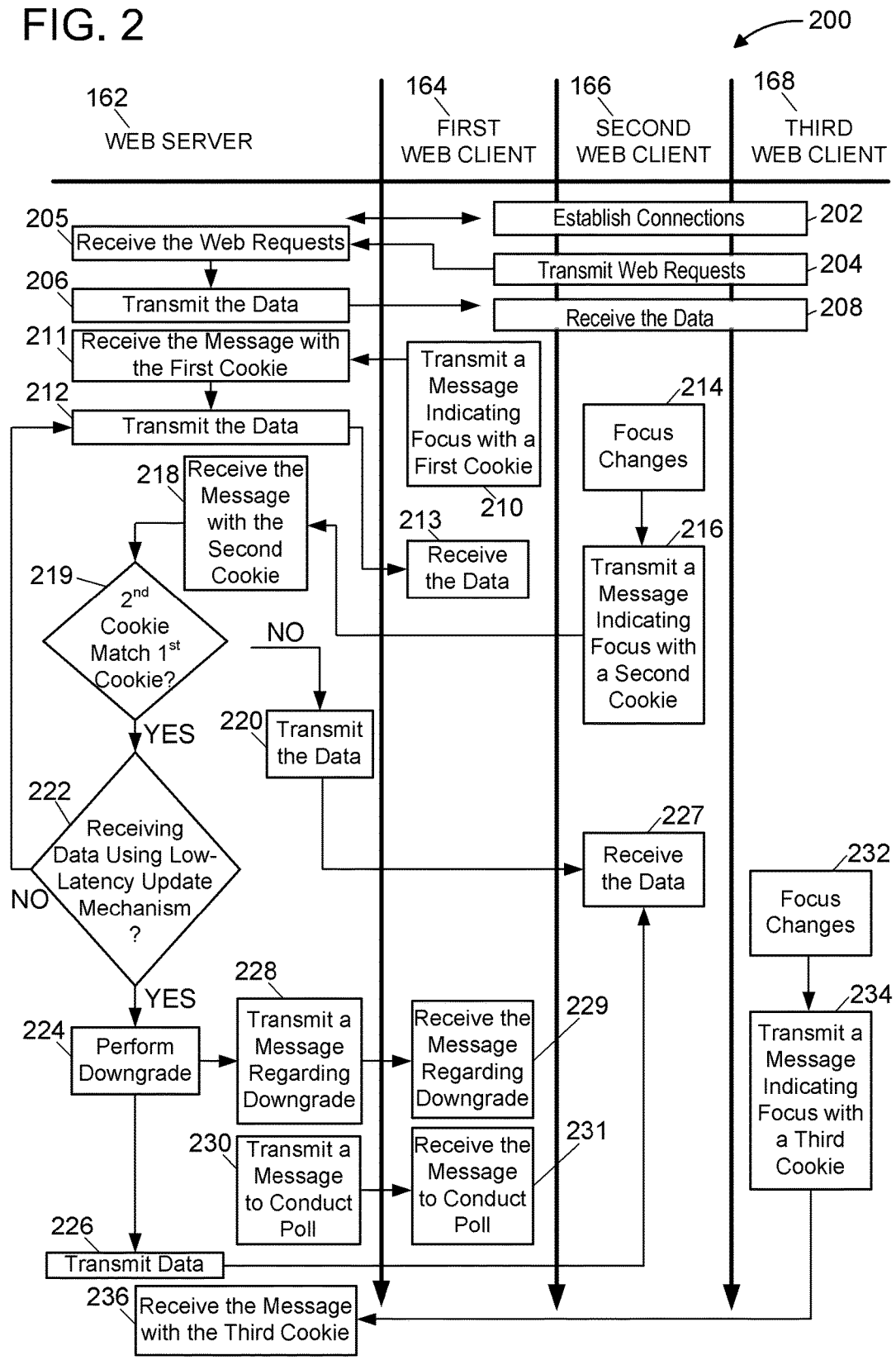

SYSTEMS AND METHODS FOR TRANSMITTING DATA

CROSS REFERENCE TO RELATED APPLICATIONS

This application is a continuation of and claims priority to U.S. patent application Ser. No. 13/921,164, filed on Jun. 18, 2013, the entire contents of which are incorporated here by reference.

BACKGROUND

Web browsers retrieve data, such as information resources including a web page, an image, a video, or other piece of content, from a web server. The web browser first transmits one or more web requests, such as a hypertext transfer protocol (HTTP) GET request, to the web server, wherein the web request(s) correspond to a request to receive data. Upon receiving the web request(s), the web server can transmit the requested data to the web browser such that the web browser may display the results on a computer or other type of internet-enabled device that supports the web browser. In order to prevent the web server from becoming overloaded with too many concurrent requests, the web browser can limit the number of allowed simultaneous concurrent requests. For example, some web browsers have a limit of between four to eight simultaneous concurrent requests that can be sent to a web server. However, when the limit for concurrent requests is reached, the web browser can block requests until one of the pending request(s) are completed.

Due to the limit for concurrent requests, various techniques may be used to reduce the latency for retrieving information from a web server. One technique is to have the web browser establish multiple connections using GET requests that are queued on the server side until new information is ready to be transmitted. U.S. Patent Application Publication 2012/0324358, published Dec. 20, 2012 and incorporated herein by reference in its entirety, describes in detail an exemplary protocol for remoting a GUI from a VM to a client web browser via HTTP GET requests. Another technique is to use a chunked-encoding mechanism, such as COMET. For example, a long-lived HTTP connection may continuously push new data to the web browser from the web server via COMET. These low latency mechanisms generally rely on the client sending multiple GET requests, up to the allowed limit of concurrent requests, to the server for data, which the servers queue until data becomes available for sending to the client, whereupon the data is matched to one of the queued GET requests and returned to the client as a response to the GET request. Once the client receives the response, it immediately issues a new GET request. This differs from high-latency techniques wherein the server does not proactively seek the data with the expectation of having a GET request with which to match the data when the data is available. Rather, in the more traditional high-latency approach, the client periodically sends a request for data, which the server fetches only after receiving a GET request for the data.

However, there are limitations to using low latency techniques. Each of the aforementioned low latency techniques consumes at least one HTTP connection from the maximum number that is allowed between the web server and a desktop of a user for an indefinite period of time. For example, most web applications can be accessed from multiple instances of a web browser or provide some functionality via web browser window pop-ups. Each web browser instance accessing the remote web application will consume at least one connection towards the limit of available connections, and the limit is enforced as an aggregate number across all open web browser instances running on the same desktop. As such, web applications that use low-latency techniques, such as described in the patent application publication incorporated above, dead-lock when several browser windows or tabs are opened because all connections become blocked and never released.

SUMMARY

Systems and methods described herein enable clients to transmit simultaneous concurrent requests for data to a server such that the server is enabled to transmit the requested data without increasing a load on a host and/or a remote terminal. The embodiments described herein include a server that is in communication with a plurality of clients that are being executed by a host. The server is configured to receive a message from a first client of the plurality of clients. The message indicates that the first client currently has focus, wherein the message is transmitted by the first client with a first cookie. The server is configured to identify that a second client of the plurality of clients utilizes a second cookie that matches the first cookie, wherein the second client is currently receiving data from the server using a low-latency update mechanism. The server is also configured to downgrade the second client from the low-latency update mechanism to a high-latency update mechanism, wherein the high-latency update mechanism is configured to enable the second client to conduct a poll of the server periodically for updates.

BRIEF DESCRIPTION OF THE DRAWINGS

FIG. 2 is a swimlane diagram of an exemplary method for transmitting data from the server to the plurality of clients.

DETAILED DESCRIPTION

Figure 1:
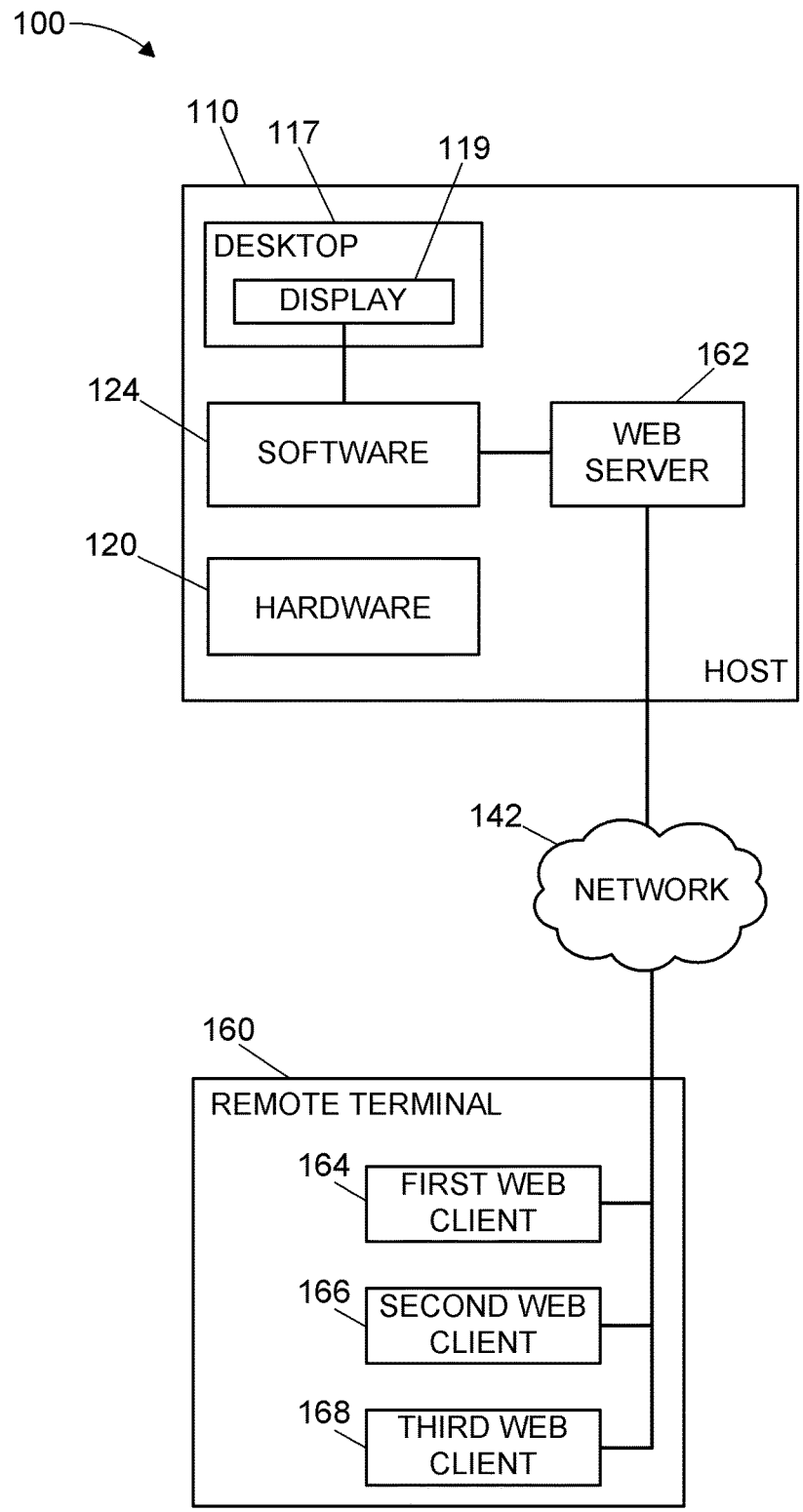
FIG. 1 is a block diagram of an exemplary system having a server in communication with a plurality of clients.

FIG. 1 shows an exemplary system 100 that includes a physical computer system or host 110. Host 110 includes hardware 120 and software 124 running on hardware 120 such that various applications may be executing on hardware 120 by way of software 124. Functionality of software 124 may alternatively be implemented directly in hardware 120, e.g., as a system-on-a-chip, firmware, FPGA, etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices, as would generally be expected in computer systems.

In the exemplary embodiment, an end user may connect to, and interact with, host 110 using a remote terminal 160 that is capable of communicating with host 110 via network 142, which may be the Internet, a LAN, a WAN, or any combination thereof. Remote terminal 160 may be a desktop computer, laptop, mobile device, electronic tablet, thin client, or other similar device. Remote terminal 160 is capable of displaying the graphical user interface GUI 119 generated by the operating system and applications running inside host 110 to the end user at remote terminal 160 using a computer display (not shown) or similar device. Remote terminal 160 may also be capable of receiving user input from the end user and transmitting the received user input to host 110.

Host 110 provides at least one desktop 117 (only one being shown in FIG. 1) to a user of host 110. The term, "desktop" refers to an interactive user interface, typically implemented using a graphical user interface that displays application and operating system output to a user and accepts mouse and keyboard inputs. In a virtual desktop infrastructure (VDI) deployment, each desktop 117 may be generated by a corresponding virtual machine (VM) (not shown). A typical VDI deployment may have tens or hundreds of virtual machines distributed across many physical hosts exporting desktops to as many users in disparate remote locations. As mentioned, desktop 117 is an interactive user environment provided by the applications and an operating system (not separately shown) running on host 110, and that includes a graphical user interface (GUI) 119 that may be spread across one or more screens or displays (not shown). Additionally, other outputs, such as audio, indicator lamps, tactile feedback, etc., may be provided. Desktop 117 may also accept user inputs from remote terminal 160 over network 142, such as keyboard and mouse inputs, which are injected into desktop 117 in an appropriate way, e.g., using an agent or virtual device interfaces (not shown) in a manner well known to those familiar with machine virtualization. In addition to user input/output, desktop 117 may send and receive device data, such as input/output for a FLASH memory device local to the user, or to a local printer. In the exemplary embodiment, GUI 119 may be presented to an end user on the computer display of remote terminal 160.

In the exemplary embodiment, host 110 also includes a server component, such as web server 162, that is in communication with software 124. In some implementations, web server 162 may instead be implemented on a stand-alone server (not shown). Web server 162 is in communication with a plurality of web clients 164, 166, and 168, via network 142. While only three web clients 164, 166, and 168 are shown in FIG. 1 and designated as first, second, and third, respectively, remote terminal 160 may have any number of web clients. Web clients 164, 166, and 168, in the exemplary embodiment, may each be conventional web browsers that are each configured to run on remote terminal 160. It should be understood that each "web browser" may be an instance of a web browser, or a "tab" or "window" providing an output of a web browser instance, or separate web browsers running on remote terminal 160. In the embodiments described herein, each web client 164, 166, and 168 corresponds to a respective web instance and each are implemented with a scripting language, such as JAVASCRIPT. Web clients 164, 166, and 168 each connect to web server 162 as necessary to, for example, receive data, such as information resources including web page(s), image(s), video(s), or other piece(s) of content.

System 100 may be a physical desktop computer system, such as a work or home computer that is remotely accessed when travelling. Alternatively, system 100 may be implemented as part of a VDI that has a plurality of VMs (not shown) on host 110. In the latter case, software 124 may be virtualization software and one or more VMs (not shown) may be executing on hardware 120 by way of the virtualization software. It should therefore be understood that the present invention can be implemented in a variety of contexts, but may be particularly useful wherever real-time data is being communicated, as for example when remotely accessing a graphical user interface.

During operation of system 100, as explained in more detail below with respect to FIG. 2, web clients 164, 166, and 168 may transmit simultaneous concurrent requests for data to web server 162 such that web server 162 is enabled to transmit the requested data to web clients 164, 166, and 168 without deadlocking or increasing a load on host 110 and/or remote terminal 160. For example, in the exemplary embodiment, web server 162 may transmit data to web clients 164, 166, and 168 using either a high-latency update mechanism or a low-latency update mechanism. The low-latency update mechanism provides updates frequently to web clients 164, 166, and 168 and may have relatively short delay times, whereas the high-latency update mechanism provides updates less frequently to web clients 164, 166, and 168 and may have relatively long delays times. While using a low-latency update mechanism is advantageous with respect to reducing delay times, the low-latency update mechanism requires more bandwidth that may result in an increase on a load to host 110 and/or remote terminal 160. Further, with each web client 164, 166, and 168 consuming at least multiple connections towards the limit of connections between web server 162, applying a low-latency update mechanism to each web client 164, 166, and 168 may dead-lock web applications running thereon if all connections between web clients 164, 166, and 168 and web server 162 become blocked or are not released. As such, in the exemplary embodiment, web server 162 selectively uses the low-latency update mechanism and varies or changes the type of update mechanism being used based on a current state of each web client 164, 166, and 168.

More specifically, in the exemplary embodiment, the JAVASCRIPT window callback function "onfocus" is used to detect when a web browser (e.g., one of web clients 164, 166, and 168) has received focus from a user. For example, the callback function "onfocus" determines whether the web browser on which the statement was executed is given "focus" by the operating system. Focus may be determined by a user when he or she selects a particular application to have focus, which generally means the window corresponding to the application is brought to the front so that no other windows overlap it, and keyboard inputs are directed to the selected application. Thus, an application that has focus is generally considered as being viewed by a user.

In one embodiment, when one of web clients 164, 166, or 168 has focus as determined by calling the "onfocus" function, it may transmit a message to web server 162 with a site or page specific cookie indicating that it currently has focus. For example, first web client 164 may currently have focus and may then transmit a message along with a cookie to web server 162. Web server 162 then determines which one of the other web client(s) 166 or 168 is receiving low-latency updates (because it previously had focus) by comparing the cookie received from first web client 164 that currently has focus with cookies received from the other web clients 166 and 168. More specifically, web server 162 identifies if one of the other web clients 166 or 168 is using the same cookie received from first web client 164 (which currently has focus) and also identifies whether the client that is using the same cookie as first client 166 is receiving data from web server 162 using a low-latency update mechanism. If one of the other web clients 166 or 168 is identified as using the same cookie as first web client 164 and is also receiving data by using a low-latency update mechanism, then the identified web client of web clients 166 or 168 is downgraded from the low-latency update mechanism to the high-latency update mechanism, and first web client 164 (which currently has focus) will then use the low-latency update mechanism. The latency-switching code (not shown) on web server 162 and/or web clients 164, 166, or 168 can be abstracted such that the underlying code does not need to know which mode (i.e., low or high-latency) of the update mechanisms are currently being used between web server 162 and web clients 164, 166, and 168.

When the identified web client of web clients 166 or 168 is in the mode for using high-latency update mechanisms, the identified web client 166 or 168 is directed to poll web server 162 periodically for updates in lieu of using, for example, a blocking request or a control channel connection, such as COMET. Such a non-blocking poll update mechanism will not cause the HTTP connection limit to be exceeded and/or dead-locked. Moreover, when an end user changes focus from one web client to another web client, switches browser tabs, or closes the currently focused window or web client, another web client is identified as having the focus of the user and a message from the newly focused web client is sent with a cookie to web server 162 indicating that it currently has focus. If the cookie matches the cookie that was previously sent by the web client that was previously in focus, then the web client that was previously in focus will be downgraded to a high-latency update mechanism if it was receiving data via a low-latency update mechanism and the web client that is currently in focus will use the low-latency update mechanism.

FIG. 2 shows a swimlane diagram 200 of an exemplary method for transmitting data from web server 162 located within host 110 (shown in FIG. 1) to web clients 164, 166, and 168 located within remote terminal 160 (shown in FIG. 1). This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

In operation 202, web clients 164, 166, and 168 each establish a connection with web server 162 to facilitate communication between web server 162 and each of web clients 164, 166, and 168. For example, each connection between web clients 164, 166, and 168 and web server 162 may be a two way HTTP connection to enable web server 162 to transmit information or data regarding web content to web clients 164, 166, and 168. In operation 204, web clients 164, 166, and 168 each transmit one or more requests, such as a GET request, to web server 162 via the established connections, wherein each request corresponds to a request for web content or data. Web server 162 receives the requests in operation 205 and, in operation 206, web server 162 transmits the requested data to web clients 164, 166, and 168. Web clients 164, 166, and 168 receive the data from web server 162 in operation 208 via either a low-latency update mechanism or a high-latency update mechanism.

Web server 162 can determine whether each of web clients 164, 166, and 168 receive updates using a low-latency update mechanism or a high-latency update mechanism by determining which of web clients 164, 166, or 168 have the focus of a user and which of web clients 164, 166, and 168 share a specific cookie (e.g., which of web clients 164, 166, and 168 are accessing the same remote web application). As explained above, the JAVASCRIPT window callback function "onfocus" may be used to detect when one of web clients 164, 166, and 168 or a particular object within a respective browser has received focus from a user. Web server 162 can then make any necessary adjustments to the type of update mechanism being used for the web client in focus and the web client(s) that are not in focus and that share the same cookie as the web client in focus.

In the exemplary embodiment, one of the web clients 164, 166, and 168 currently running has focus. For example, in operation 210, first web client 164 has focus and transmits a message to web server 162 indicating that first web client 164 has focus. In the exemplary embodiment, the message is transmitted along with a site or a page specific first cookie. Web server 162 receives the message, along with the first cookie, in operation 211 and transmits the requested data to first web client 164 using a low-latency update mechanism in operation 212. In operation 213, first web client 164 receives the requested data.

Web server 162 may then determine if a cookie received by either second web client 166 or third web client 168 matches the first cookie (i.e., the cookie received from first web client 164). If a cookie from second web client 166 matches the first cookie, then web server 162 applies a high-latency update mechanism to second web client 166. Further, if a cookie from third web client 168 matches the first cookie, then web server 162 applies a high-latency update mechanism to third web client 168 as well (not shown, but illustrated by the next series of operations).

In operation 214, the focus changes to second web client 166. For example, an end user may change window focus from first client 164 to second web client 166 by selecting the second web client 166. As a result, second web client 166 transmits a message to web server 162 indicating that second web client 166 now has focus in operation 216. The message sent to web server 162 in operation 216 is transmitted along with a site or page specific cookie (e.g., a second cookie). In operation 218, web server 162 receives the message.

In operation 219, web server 162 identifies whether the second cookie received with the message from second web client 166 matches the first cookie received with the message from first web client 164. If the cookies do not match, then web server 162 continues to transmit data to first web client 164 using the low-latency update mechanism in operation 212 and web server 162 will transmit data to second web client 166 using the low latency update mechanism in operation 220. The cookies would likely not match if, for example, the web server 162 was receiving cookies from web clients that were located in different remote terminals. In contrast, if the second cookie matches the first cookie, then web server 162 determines whether first web client 164 is also receiving data using a low-latency update mechanism in operation 222. In the exemplary embodiment, because first web client 164 is receiving data via a low-latency update mechanism, then web server 162 downgrades first web client 164 from the low-latency update mechanism to a high latency mechanism in operation 224 and transmits data to second web client 166 using a low-latency update mechanism in operation 226. Second web client 166 receives the data in operation 227. Alternatively, if first web client 164 was not receiving data via a low-latency update mechanism, then web server 162 continues to transmit data to first web client 164 in operation 212 and does not make any changes as to how data is being transmitted between web server 162 and first web client 164. If the end user had, for example, closed first web client 164, then web server 162 would cease transmitting data to web client 164 altogether.

In making the downgrade for first web client 164, web server 162 transmits a message to first web client 164 regarding the downgrade from a low-latency update mechanism to a high-latency update mechanism in operation 228. First web client 164 receives the message in operation 229. More specifically, based on the determination that first web client 164 is to utilize a high-latency update mechanism, web server 162 transmits a message to first web client 164 to instruct first web client 164 to conduct a poll of web server 162 periodically for updates in operation 230. For example, first web client 164 may poll web server 162 when the focus changes again or after each time a pre-defined period of time has elapsed. First web client 164 receives the message to conduct a poll in operation 231.

As the focus of the user changes, web server 162 implements any necessary downgrades or upgrades and the aforementioned process is repeated. For example, in operation 232, the focus may change to third web client 168. As a result, third web client 168 will transmit a message to web server 162 in operation 234 indicating that third web client 168 now has focus. The message sent to web server 162 in operation 234 is transmitted along with a third cookie. In operation 236, web server 162 receives the message sent by third web client 168. Web server 162 then identifies whether the third cookie received with the message from third web client 168 matches the cookies (the first cookie and the second cookie) received with messages from first web client 164 and/or second web client 166 as shown in operation 219, and web server 162 implements the steps to determine the necessary downgrades as shown in operations 220-226. Any necessary downgrades or upgrades can then be implemented as shown in operations 228-230.

In an alternate embodiment (not shown) each web browser may be programmed via JAVASCRIPT to act independently with respect to other browsers and only issue low-latency data requests when it has focus, and automatically switch to high-latency update requests whenever it loses focus. This alternate embodiment has a disadvantage that if only one browser is fetching data, it will revert to high-latency updates even when there are no other browsers running and hence no danger of deadlock. For instance, the user may be accessing a document with a word processor in one window while a single browser instance is continuing to retrieve updates. In that case, even though no other browser windows are vying for server updates, it may revert to low-latency updates with the alternate embodiment. On the other hand, if the presumption is that the user is not paying close attention to the browser that has lost focus (because, e.g., he or she is entering text into a document) then reverting to the high-latency mode can save considerable network and server compute bandwidth by simply reducing frequency of data updates.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising a server computer in communication with a plurality of web clients running on one or more remote terminal devices, the server computer having one or more processors and one or more memory devices and being configured to:
   receive a message from a first web client of the plurality of web clients, the first web client running on a first remote terminal device, the message indicating that the first web client currently has focus, wherein the message is transmitted by the first web client with a cookie;
   determine, for each other web client of the plurality of web clients, whether the other web client is both i) receiving low-latency updates and ii is using the same cookie received from the first web client;
   in response to determining that one or more other web clients is both i) using the same cookie and ii) is receiving data using a low-latency update mechanism, downgrading the one or more other web clients to a high-latency update mechanism that provides updates less frequently than the low-latency update mechanism; and
   transmit updates to the first web client using the low-latency update mechanism.

2. The system of claim 1, wherein each web client corresponds to a respective web browser instance.

3. The system of claim 1, wherein applying the high-latency update mechanism includes transmitting a message to the one or more other web clients that directs the respective web clients to conduct a poll of the server computer periodically for updates.

4. The system of claim 1, wherein:
   the server computer is further configured to receive an additional message from a second web client of the plurality of web clients, the additional message from the second web client indicating that the second web client currently has focus, and wherein the additional message is transmitted by the second web client with a cookie that matches the cookie received from the first web client; and
   the server computer is further configured to downgrade the first web client from the low-latency update mechanism to the high-latency update mechanism based on the additional message.

5. The system of claim 4, wherein the server computer is further configured to maintain the second web client in the high-latency update mechanism when the first web client is downgraded from the low-latency update mechanism to the high latency update mechanism.

6. The system of claim 1, wherein the server is further configured to:
   receive concurrent requests for data from each of the plurality of web clients; and
   transmit the requested data to each of the plurality of web clients, wherein the requested data is transmitted to each web client using either a low-latency or high-latency update mechanism.

7. The system of claim 1, wherein the server is further configured to:
   receive an additional message from a third web client of the plurality of web clients, the additional message from the third web client indicating that the third web client currently has focus, and wherein the additional message is transmitted by the third web client with a cookie that does not match the cookie received from the first web client.

8. The system of claim 7, wherein the third web client is located on a different remote terminal than the first web client.

9. The system of claim 7, wherein in response to determining that the cookie received from the third web client does not match the cookie received from the first web client, the server computer does not change how updates are transmitted to the first web client.

10. A method comprising:
    receiving a message at a server computer from a first web client of a plurality of web clients, the message indicating that the first web client currently has focus, wherein the message is transmitted by the first web client with a cookie;
    determining, for each other web client of the plurality of web clients, whether the other web client is both i) receiving low-latency updates and ii) and is using the same cookie received from the first web client;
    in response to determining that one or more other web clients is both i) using the same cookie and ii) is receiving data using a low-latency update mechanism, downgrading the one or more other web clients to a high-latency update mechanism that provides updates less frequently than the low-latency update mechanism; and
    transmitting updates to the first web client using the low-latency update mechanism.

11. The method of claim 10, wherein each web client corresponds to a respective web browser instance.

12. The method of claim 10, wherein applying the high-latency update mechanism includes transmitting a message to the one or more other web clients that directs the respective web clients to conduct a poll of the server computer periodically for updates.

13. The method of claim 10, further comprising:
    receiving an additional message from a second web client of the plurality of web clients, the additional message from the second web client indicating that the second web client currently has focus, and wherein the additional message is transmitted by the second web client with a cookie that matches the cookie received from the first web client; and
    downgrading the first web client from the low-latency update mechanism to the high-latency update mechanism based on the additional message.

14. The method of claim 13, further comprising:
    maintaining the second web client in the high-latency update mechanism when the first web client is downgraded from the low-latency update mechanism to the high latency update mechanism.

15. The method of claim 10, further comprising:
    receiving concurrent requests for data from each of the plurality of web clients; and
    transmitting the requested data to each of the plurality of web clients, wherein the requested data is transmitted to each web client using either a low-latency or high-latency update mechanism.

16. The method of claim 10, further comprising:
    receiving an additional message from a third web client of the plurality of web clients, the additional message from the third web client indicating that the third web client currently has focus, and wherein the additional message is transmitted by the third web client with a cookie that does not match the cookie received from the first web client.

17. The method of claim 16, wherein the third web client is located on a different remote terminal than the first web client.

18. The method of claim 16, wherein in response to determining that the cookie received from the third web client does not match the cookie received from the first web client, the server computer does not change how updates are transmitted to the first web client.

19. One or more one non-transitory computer-readable storage media having computer-executable instructions embodied thereon, wherein, when executed by at least one processor, the computer-executable instructions cause the at least one processor to:

receive a message at the server computer from a first web client of the plurality of web clients, the message indicating that the first web client currently has focus, wherein the message is transmitted by the first web client with a cookie;

determine, for each other web client of the plurality of web clients, whether the other web client is both i) receiving low-latency updates and ii) is using the same cookie received from the first web client;

in response to determining that one or more other web clients is both i) using the same cookie and ii) is receiving data using a low-latency update mechanism, the one or more other web clients are downgraded to a high-latency update mechanism that provides updates less frequently than the low-latency update mechanism; and transmit updates to the first web client using the low-latency update mechanism.

* * * * *